United States Patent [19]

Bingler

[11] Patent Number: 4,543,228
[45] Date of Patent: Sep. 24, 1985

[54] INJECTION MOLDED SLIDING VANE PUMP

[75] Inventor: Douglas J. Bingler, Furlong, Pa.

[73] Assignee: Milton Roy Company, St. Petersburg, Fla.

[21] Appl. No.: 570,328

[22] Filed: Jan. 13, 1984

[51] Int. Cl.$^4$ .............................................. B29B 3/00
[52] U.S. Cl. .................................. 264/275; 264/242; 425/577
[58] Field of Search ...................... 264/242, 255, 271.1, 264/275, 277; 425/577; 249/85, 88

[56] References Cited
U.S. PATENT DOCUMENTS 2,925,786  2/1960  Hill .
4,076,791  2/1978  Barter et al. .................. 264/272.15
4,337,574  7/1982  Hughes et al. ................. 264/272.11

Primary Examiner—Donald Czaja
Assistant Examiner—V. Fischbach
Attorney, Agent, or Firm—Woodcock, Washburn, Kurtz, Mackiewicz & Norris

[57] ABSTRACT

An injection molding process for fabricating a sliding vane pump with a close tolerance between the rotor assembly and the pump chamber using two semi-circular inserts to hold the rotor assembly while the molten plastic is injected to form the housing. The inserts function to stop the molten plastic from entering the rotor assembly during injection and upon removal to form the inlet and outlet ports of the pump.

1 Claim, 7 Drawing Figures

INJECTION MOLDED SLIDING VANE PUMP

BACKGROUND OF THE INVENTION

This invention relates to sliding vane pumps, and more particularly, to an improved method of and mold for fabricating a sliding vane pump.

U.S. Pat. No. 2,925,786-Hill shows a sliding vane pump having a housing with a pump chamber that encloses a rotor. Sliding vanes on the rotor displace fluid as the rotor rotates. Fluid enters through an inlet port and is discharged from an outlet by the sliding vanes.

These pumps are manufactured by machining metal or plastic pump housings to produce a pump chamber which accommodates the rotor assembly with the required close tolerance. This machining is very involved because the porting of the fluid is complex and the pump chamber components must fit precisely to assure proper pump performance.

SUMMARY OF THE INVENTION

In accordance with the present invention, a sliding vane pump with a close tolerance between the rotor assembly and the pump chamber is fabricated by injection molding the pump housing while the rotor assembly is positioned in the mold. This produces a pump subassembly that does not require machining operations. In accordance with the invention, two semi-circular holding inserts are positioned in the mold cavity. These hold the rotor assembly while molten plastic is injected into the mold cavity. After the housing has been formed, the inserts are removed to form the ports of the pump. The semi-circular inserts perform the further function of blocking the openings in the rotor assembly so that plastic is not injected into these openings.

The foregoing and other objects, features and advantages of the invention will be better understood from the following more detailed description and appended claims.

SHORT DESCRIPTION OF THE DRAWINGS

FIG. 1 is a perspective view of the pump housing;
FIG. 2 is a section on the lines 2—2 of FIG. 1;
FIG. 2A is a view from the bottom of the pump showing the pump chamber;
FIG. 3 shows the mold base;
FIG. 4 is a section on the lines 4—4 of FIG. 3;
FIG. 5 is a partial section on the lines 5—5 of FIG. 4; and
FIG. 6 is an exploded view showing the positioning of the inserts and the rotor assembly in the mold base.

DESCRIPTION OF THE PREFERRED EMBODIMENT

Figure 1:
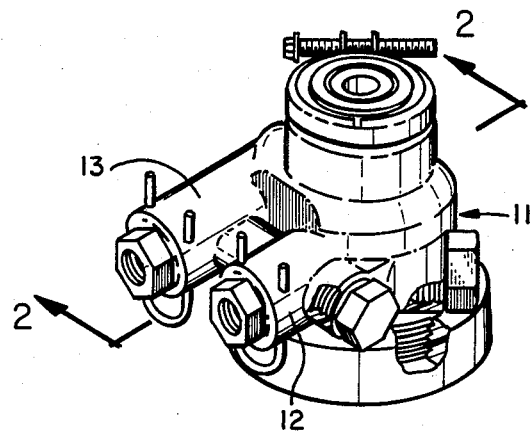
Figure 2:
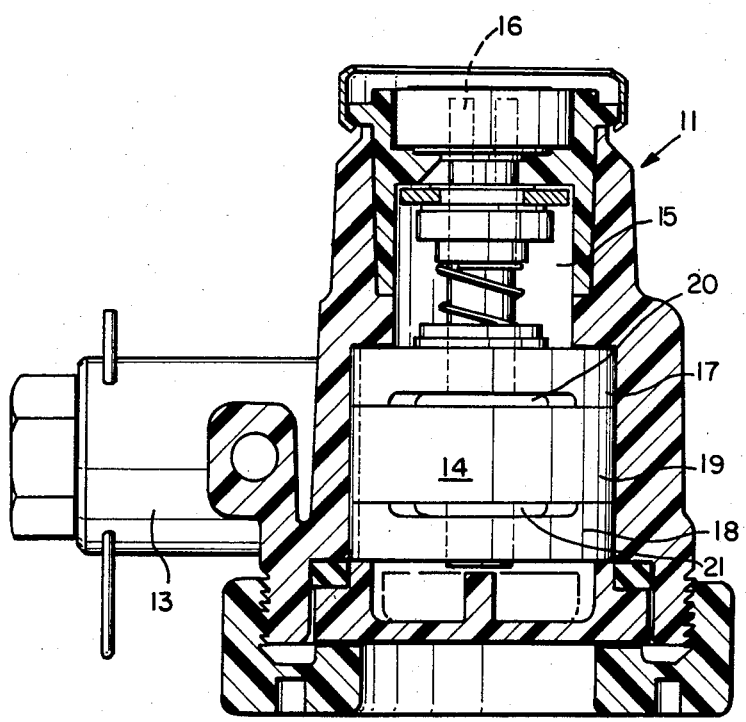
Figure 2A:
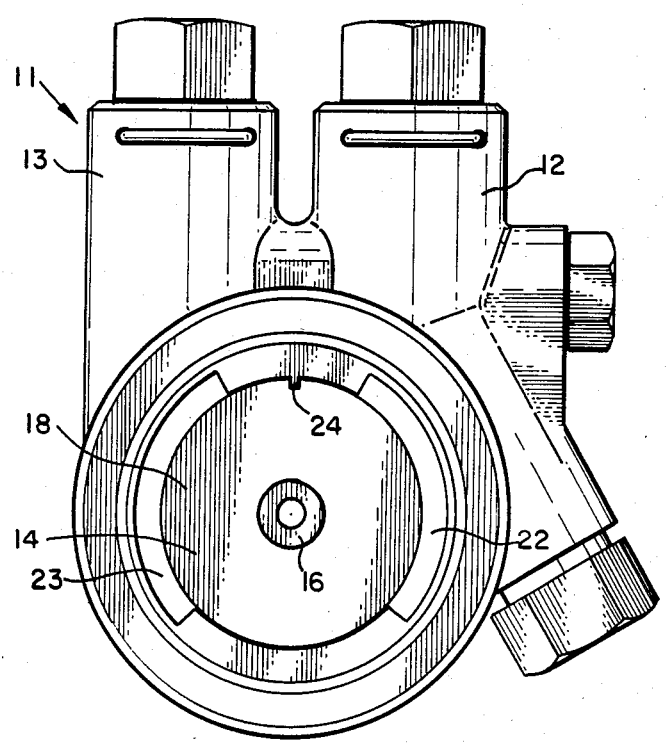

FIG. 1 shows a housing 11 for a sliding vane pump for pumping liquids between an inlet connection 12 and an outlet connection 13. As shown in FIGS. 2 and 2A, the pump housing has a pump chamber 14 and a seal chamber 15. A rotor assembly is positioned in the pump chamber 14 with the drive shaft 16 extending into the seal chamber 15. The rotor assembly includes graphite plates 17 and 18 with a liner 19 between the plates. The rotor assembly is fixed to drive shaft 16 (FIG. 2A) and is radially slotted at 90° to accommodate suitable graphite vanes (not shown) which are centrifugally forced radially outward against the eccentrically bored graphite liner 19.

Plates 17 and 18 have slots at 20 and 21 for the passage of fluid. As the rotor rotates, the moving vanes transfer fluid from the inlet port 12 to the outlet port 13, which ports are formed in the pump housing 11 and are in communication with the pump chamber 14, as best shown in FIG. 2A.

Slots in the plates 17 and 18 and in the liner 19 are engaged by a ridge 24 running the length of the pump chamber. This ridge secures the plates 17 and 18 and the liner 19 from rotating while the rotor rotates within these components.

It is extremely important that the plates 17 and 18 and the liner 19 fit within a very close tolerance in the pump chamber 14. In the prior art, the pump housing 11 has been machined from brass or the like to obtain the close tolerance between the graphite components of the rotor assembly and the pump chamber.

In accordance with the present invention, the close tolerance between the rotor assembly and the pump chamber is obtained by plastic injection molding of the housing with the rotor assembly in place in the mold. In this manner, the required close tolerance is obtained.

Figure 3:
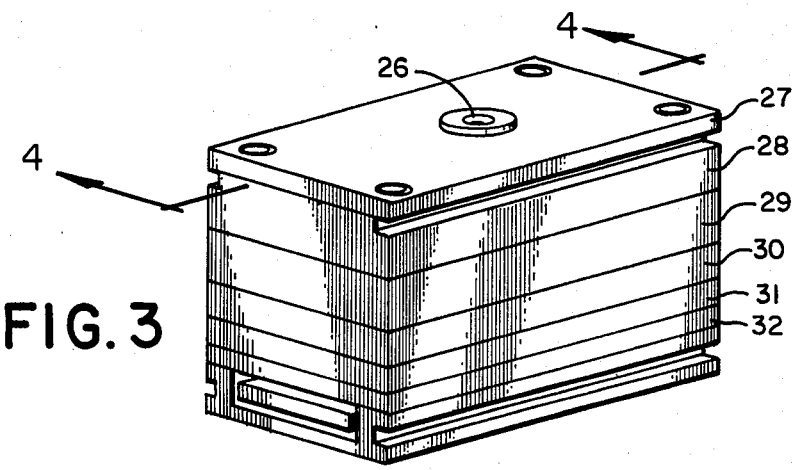
Figure 4:
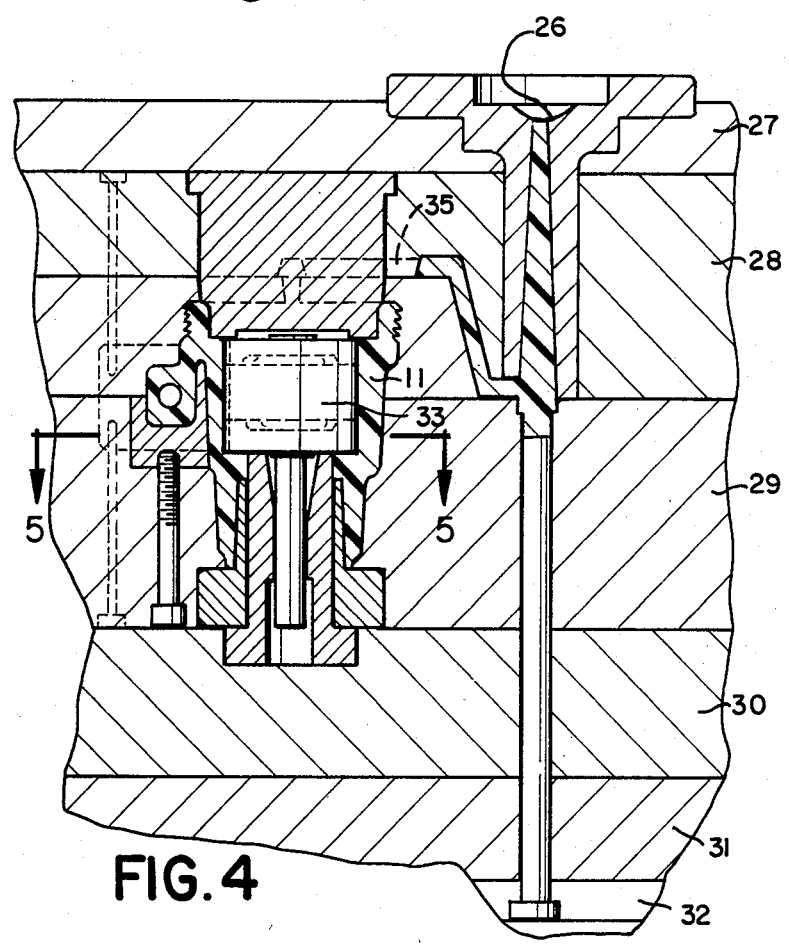
Figure 5:
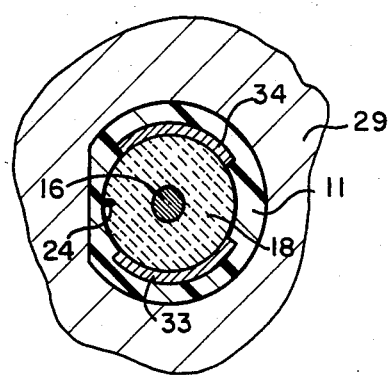
Figure 6:
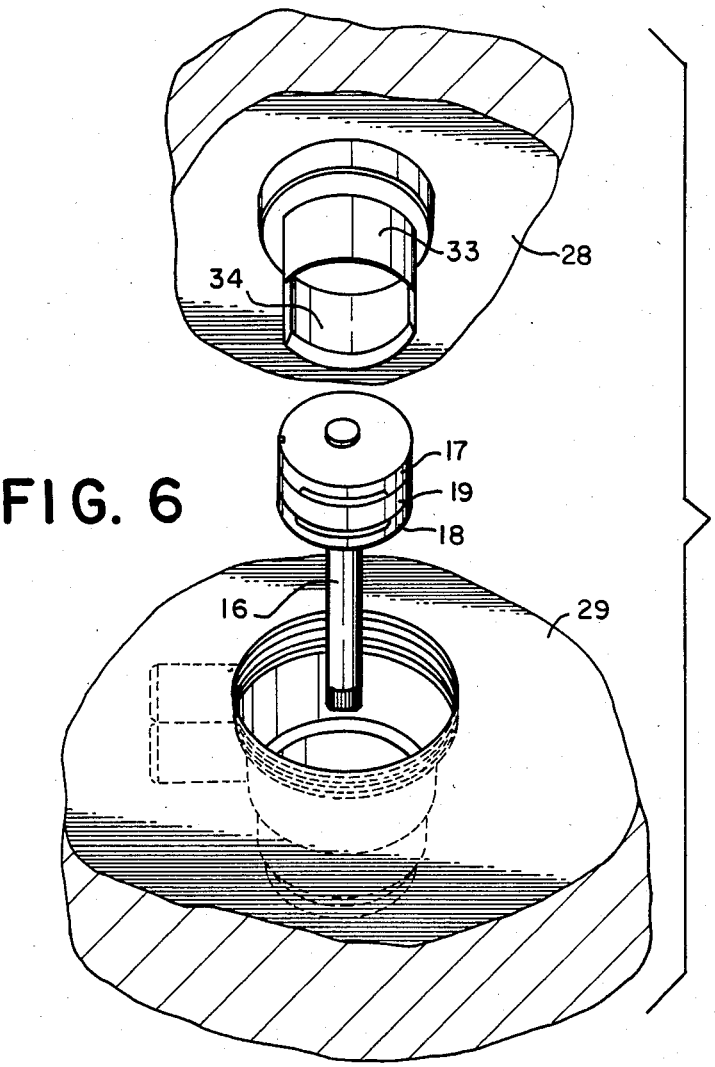

FIG. 3 shows an injection mold base with a sprue entrance 26 and mold parts 27-32. These define a cavity for forming the pump housing 11. As shown in FIGS. 4-6, semi-circular holding inserts 33 and 34 are positioned in the mold cavity. These inserts hold the rotor assembly including plates 17 and 18 and liner 19 in the mold. Plastic is injected through sprue entrance 26 and the gate 35 into the mold cavity. The pump housing is molded around the rotor assembly thereby obtaining the required close tolerance. Furthermore, inserts 33 and 34 form the inlet and outlet ports 22 and 23 in the pump chamber. Inserts 33 and 34 also perform the function of covering the slots 20 and 21, thereby preventing plastic from flowing into the openings in the rotor assembly. Further in accordance with the invention, the ridge 24 is accurately formed in the pump housing to engate the mating slots in plates 17 and 18 and in liner 19.

In this manner, a pump housing having a pump chamber with a close tolerance with its rotor has been formed.

While a particular embodiment of the invention has been described, various modifications are within the true spirit and scope of the invention. The appended claims are, therefore, intended to cover all such modifications.

What is claimed is:

1. The method of plastic injection molding of the housing for a pump which includes a rotor which rotates within a close tolerance pump chamber, said rotor being in an assembly having openings therein which connect an inlet port and an outlet port molded in said housing comprising:
   positioning two semi-circular holding inserts in a mold base which has a cavity for forming said housing with said chamber in the middle thereof, said inserts being positioned in said cavity and located to form said inlet and outlet ports during molding;
   placing a pump rotor assembly in said cavity, and held in place by said inserts with said inserts covering the openings in said rotor assembly;
   forming said housing with said pump chamber having a close tolerance with said rotor assembly by injecting molten plastic into said cavity;
   forming inlet and outlet ports in said housing by injecting molten plastic around said inserts;
   removing said housing from said mold; and removing said inserts to form said inlet and outlet.

* * * * *